US012133827B2

(12) United States Patent
Ma et al.

(10) Patent No.: US 12,133,827 B2
(45) Date of Patent: Nov. 5, 2024

(54) MASSAGE HEAD UNIT, VIBRATION ASSEMBLY AND SMART WEARABLE DEVICE

(71) Applicant: SHENZHEN BREO TECHNOLOGY CO., LTD., Shenzhen (CN)

(72) Inventors: Xuejun Ma, Shenzhen (CN); Xianle Tao, Shenzhen (CN); Rui Li, Shenzhen (CN)

(73) Assignee: SHENZHEN BREO TECHNOLOGY CO., LTD., Shenzhen (CN)

( * ) Notice: Subject to any disclaimer, the term of this patent is extended or adjusted under 35 U.S.C. 154(b) by 609 days.

(21) Appl. No.: 17/424,127

(22) PCT Filed: Nov. 28, 2019

(86) PCT No.: PCT/CN2019/121591
§ 371 (c)(1),
(2) Date: Jul. 19, 2021

(87) PCT Pub. No.: WO2021/003969
PCT Pub. Date: Jan. 14, 2021

(65) Prior Publication Data

US 2022/0125670 A1 Apr. 28, 2022

(30) Foreign Application Priority Data

Jul. 10, 2019 (CN) ......................... 201910621757.5

(51) Int. Cl.
*A61H 23/02* (2006.01)
*A61H 7/00* (2006.01)

(52) U.S. Cl.
CPC ......... *A61H 23/0263* (2013.01); *A61H 7/007* (2013.01); *A61H 2201/0207* (2013.01);
(Continued)

(58) Field of Classification Search
CPC . A61H 23/0254; A61H 23/0263; A61H 23/02
See application file for complete search history.

(56) References Cited

U.S. PATENT DOCUMENTS 4,506,659 A 3/1985 Chester
5,607,749 A 3/1997 Strumor
(Continued)

FOREIGN PATENT DOCUMENTS

CN 203507082 U 4/2014
CN 104546400 A 4/2015
(Continued)

OTHER PUBLICATIONS

International Search Report and Written Opinion of the International Searching Authority, issued in PCT/CN2019/121591, mailed Apr. 9, 2020; ISA/CN.

*Primary Examiner* — Joseph D. Boecker
*Assistant Examiner* — Thomas W Greig
(74) *Attorney, Agent, or Firm* — Andrew C. Cheng

(57) ABSTRACT

A massage head unit, a vibration assembly and a smart wearable device, including: a soft rubber base plate, a plurality of vibrating members, a plurality of soft rubber massage heads, and a plurality of soft rubber pleated bodies capable of stretching and deforming in a axial direction of each massage head; the base plate, the pleat bodies and the massage heads are integrally molded by injection molding, the base plate is provided with a plurality of through holes penetrating therethrough, and the through holes, the pleated bodies and the massage heads are in one-to-one correspondence, each massage head is provided with a mounting cavity mounted with at least one vibrating member, each pleated body is connected to a bottom of the massage head
(Continued)

and an edge of the through hole, such that each of the massage heads is floating and supported on the edge of the through hole.

18 Claims, 10 Drawing Sheets

(52) U.S. Cl.
CPC .................. *A61H 2201/165* (2013.01); *A61H 2201/1671* (2013.01); *A61H 2201/169* (2013.01); *A61H 2201/5071* (2013.01); *A61H 2205/024* (2013.01)

(56) References Cited

U.S. PATENT DOCUMENTS

| | | | | |
|---|---|---|---|---|
| 6,551,450 | B1 * | 4/2003 | Thomas | A61H 9/0078<br>297/284.6 |
| 8,128,583 | B2 * | 3/2012 | Ghatge | A61H 39/04<br>601/134 |
| 8,894,593 | B2 * | 11/2014 | Ikeyama | A61H 23/0263<br>601/67 |
| 9,642,769 | B2 * | 5/2017 | Ma | A61H 15/0078 |
| 2005/0059911 | A1 * | 3/2005 | Lin | A61H 23/0263<br>601/70 |
| 2010/0004573 | A1 * | 1/2010 | Mairet | A61H 1/008<br>601/46 |
| 2017/0252258 | A1 * | 9/2017 | Ma | A61H 7/004 |
| 2020/0069512 | A1 * | 3/2020 | Lee | A61H 23/0263 |

FOREIGN PATENT DOCUMENTS

| | | | |
|---|---|---|---|
| CN | 105342751 | A | 2/2016 |
| CN | 205108300 | U | 3/2016 |
| CN | 205126767 | U | 4/2016 |
| CN | 207886428 | U | 9/2018 |
| CN | 108771611 | A | 11/2018 |
| CN | 109907410 | A | 6/2019 |
| CN | 109907964 | A | 6/2019 |
| CN | 208927009 | U | 6/2019 |
| CN | 110353969 | A | 10/2019 |
| FR | 2706131 | A1 | 12/1994 |
| KR | 100922277 | B1 | 10/2009 |

* cited by examiner

MASSAGE HEAD UNIT, VIBRATION ASSEMBLY AND SMART WEARABLE DEVICE

CROSS REFERENCE TO RELATED APPLICATION

The present application is a National phase of International patent Application No. PCT/CN2019/121591, filed on Nov. 28, 2019, and claims priority of Chinese Patent Application No. 201910621757.5, filed on Jul. 10, 2019, the entire content of which is incorporated in the present application by reference.

TECHNICAL FIELD

The present application relates to the technical field of smart wearable device, and more particularly to a massage head unit, a vibration assembly and a smart wearable device.

BACKGROUND

The statements herein only provide background information related to the present application, and do not necessarily constitute prior art.

The Chinese invention patent application with the publication number CN105342751A and titled of "An eye mask massager using vibration to massage eyes" discloses a massager, which includes a cover body and a plurality of micro-vibration motors embedded in the cover body, and the vibration of the micro-vibration motor is used to massage the eye acupoints. However, this type of massager has the following shortcomings: the vibration motors are embedded in a same cover body, and the vibration motors will interfere with each other, thereby reducing the comfort during use.

Therefore, it is necessary to provide a new device that can use vibration to achieve a massage effect.

SUMMARY

One of objects of embodiments of the present application is to provide a massage head unit, a vibration assembly and a smart wearable device, in order to solve the problem of controlling resonance and noise generation and improving the comfort of use.

In order to solve above technical problem, the technical solution adopted by the present application are:

In a first aspect, a vibration assembly is provided. The vibration assembly includes a soft rubber base plate, a plurality of vibrating members, a plurality of soft rubber massage heads, and a plurality of soft rubber pleated bodies capable of stretching and deforming in a axial direction of each massage head; wherein the base plate, the pleat bodies and the massage heads are integrally molded by injection molding, the base plate is provided with a plurality of through holes penetrating therethrough, and the through holes, the pleated bodies and the massage heads are in one-to-one correspondence, each massage head is provided with a mounting cavity, and the mounting cavity of each massage head is mounted with at least one vibrating member, each pleated body is connected to a bottom of the massage head and an edge of the through hole, such that each massage head is floating and supported on the edge of the through hole.

In an embodiment, the base plate, the massage head, and the pleated body are made of soft rubber, the soft rubber is deformed when an external force is applied thereon, and is recovered when the external force is removed, the soft rubber such as silica gel. The massage head is floating and supported above the corresponding through hole, and the massage head can be located above the through hole as a whole, or the bottom of the massage head can extend into the through hole and only part of the massage head is located above the through hole.

In an embodiment, the bottom of each massage head is provided with a ring of lip extending outwardly in a radial direction of the massage head, each pleated body is a revolving body surrounding the massage head, a longitudinal section of the pleated body is U-shaped, and two ends of the pleated body are respectively connected to the edge of the through hole and the lip.

In an embodiment, the bottom of each massage head is provided with a ring of lip extending outwardly in a radial direction of the massage head, each pleated body is a revolving body surrounding the massage head, a middle portion of the massage head is provided with a curved section, a bottom of the pleated body is connected to the lip, and a top of the pleated body is connected to the edge of the through hole.

In an embodiment, the mounting cavity extends in the axial direction of the massage head, a bottom of the mounting cavity is opened and a top of the mounting cavity is closed, the vibrating members are placed vertically or flat in the mounting cavity.

In an embodiment, each massage head is a hollow cylindrical body.

In an embodiment, each mounting cavity is able to mount at least one vibrating member, and an amount of the vibrating member in each mounting cavity can be the same or different. The vibrating member(s) can be mounted horizontally or vertically in the mounting cavity, and for each mounting cavity, all the vibrating members can be placed flat, and all the vibrating members can be placed vertically, or some of the vibrating members are placed flat and the other vibrating members are placed vertically. Generally, one or two vibrating members can be mounted in each mounting cavity. Of course, other numbers of vibrating members can also be provided. The vibrating member(s) can be fixed in the mounting cavity, and can be taken out from the mounting cavity for easy maintenance and replacement. The vibrating member(s) can be a flat motor, a voice coil motor, a piezoelectric ceramic, a high-speed relay, or other structures capable of vibrating.

In a second aspect, a massage head unit is provided, the massage head unit includes a vibrating member, a soft rubber massage head, and a soft rubber pleated body capable of stretching and deforming in a axial direction of the massage head; wherein the pleat body and the massage head are integrally molded by injection molding, the massage head is provided with a mounting cavity, at least one the vibrating member is mounted in the mounting cavity of each massage head, and the pleated body is connected with a bottom of the massage head.

In an embodiment, the massage head unit further includes a drive control board, the drive control board is signal-connected to the vibrating member, and the drive control board is fixed in the mounted cavity.

In an embodiment, the massage head unit further includes a heating sheet, a heat insulation sheet, a vibrating member and a pressure sensor which are sequentially stacked and fixed inside the massage head from an inside to an outside.

In an embodiment, the drive control board includes an information processing unit and a control unit, the information processing unit is configured to receive and process a detected data of the pressure sensor, and the control unit is configured to receive a processing signal of the information processing unit and to generate a corresponding control instruction, the control instruction controls a working state of the massage head unit.

In a third aspect, a smart wearable device is provided, the smart wearable device includes a hard casing, and a plurality of massage head units, and pleated bodies of each massage head unit are connected to an inner side of the casing. The inner side of the casing is a side adjacent to a human body of the user.

In an embodiment, the massage head unit is provided independently. The plurality of massage head units can share a soft rubber base plate to form a vibration assembly, and the entire vibration assembly is positioned inside the casing through the base plate. Each massage head unit can also be directly connected to the inner side of the casing through its respective pleated body.

In an embodiment, the smart wearable device further includes a soft rubber base plate; the base plate, the pleat bodies and the massage heads are integrally molded by injection molding, the base plate is provided with a plurality of through holes penetrating therethrough, and the through holes, the pleated bodies and the massage heads are in one-to-one correspondence, each massage head is provided with a mounting cavity, and the mounting cavity of each massage head is mounted with at least one vibrating member, the pleated body is connected to a bottom of the massage head and an edge of the through hole, the base plate is fixed at the inner side of the casing.

In an embodiment, the pleated body is an annular revolving body with a curved section in a middle portion of the pleated body, a bottom of the pleated body is integrally connected with a lip of the massage head, and a top of the pleated body is integrally connected with the edge of the through hole, and the bottom of the massage head is able to extend into the through hole.

In an embodiment, the smart wearable device further includes hard brackets, the brackets embed with the base plate, and the brackets are fixed at the inner side of the casing.

In an embodiment, a number of the bracket is two, a number of the base plate is two, and the brackets are arranged corresponding to the base plates.

In an embodiment, a gap is formed between the bottom of the massage head and the casing along the axial direction of the massage head.

In an embodiment, the casing may include a front housing and a bottom housing, the bottom housing is fixed at an inner side the front housing, and a mounting space is formed between the bottom housing and the front housing. A main control board and a power supply of the wearable device can be fixed in the mounting space. The main control board can be signal-connected to the drive control board in each massage head through a wire. A gap can be formed between the bottom of the massage head and the bottom housing, so that when the massage head is stretching along its axis, it will not contact the bottom housing.

The beneficial effect of the massage head unit provided by the embodiments of the present application is that by providing soft rubber pleated bodies, the transmission of vibration to the hard casing of the wearable device can be effectively reduced or avoided, thereby the generation of the resonance and noise can be effectively controlled, and the comfort of the use of the device can be improved.

The beneficial effect of the vibration assembly provided by the embodiments of the present application is that by providing soft rubber pleated bodies, the transmission of vibration to the hard casing of the wearable device can be effectively reduced or avoided, thereby the generation of the resonance and noise can be effectively controlled, and the comfort of the use of the device can be improved.

The beneficial effect of the wearable device provided by the embodiments of the present application is that by providing soft rubber pleated bodies, the transmission of vibration to the hard casing of the wearable device can be effectively reduced or avoided, thereby the generation of the resonance and noise can be effectively controlled, and the comfort of the use of the device can be improved.

BRIEF DESCRIPTION OF THE DRAWINGS

In order to more clearly describe the technical solutions in the embodiments of the present application, the following will briefly introduce the accompanying drawings that need to be used in the description of the embodiments or exemplary technologies. Obviously, the accompanying drawings in the following description are only of the present application. For some embodiments, those skilled in the art can obtain other drawings based on these drawings without creative work.

DETAILED DESCRIPTION

Figure 1:
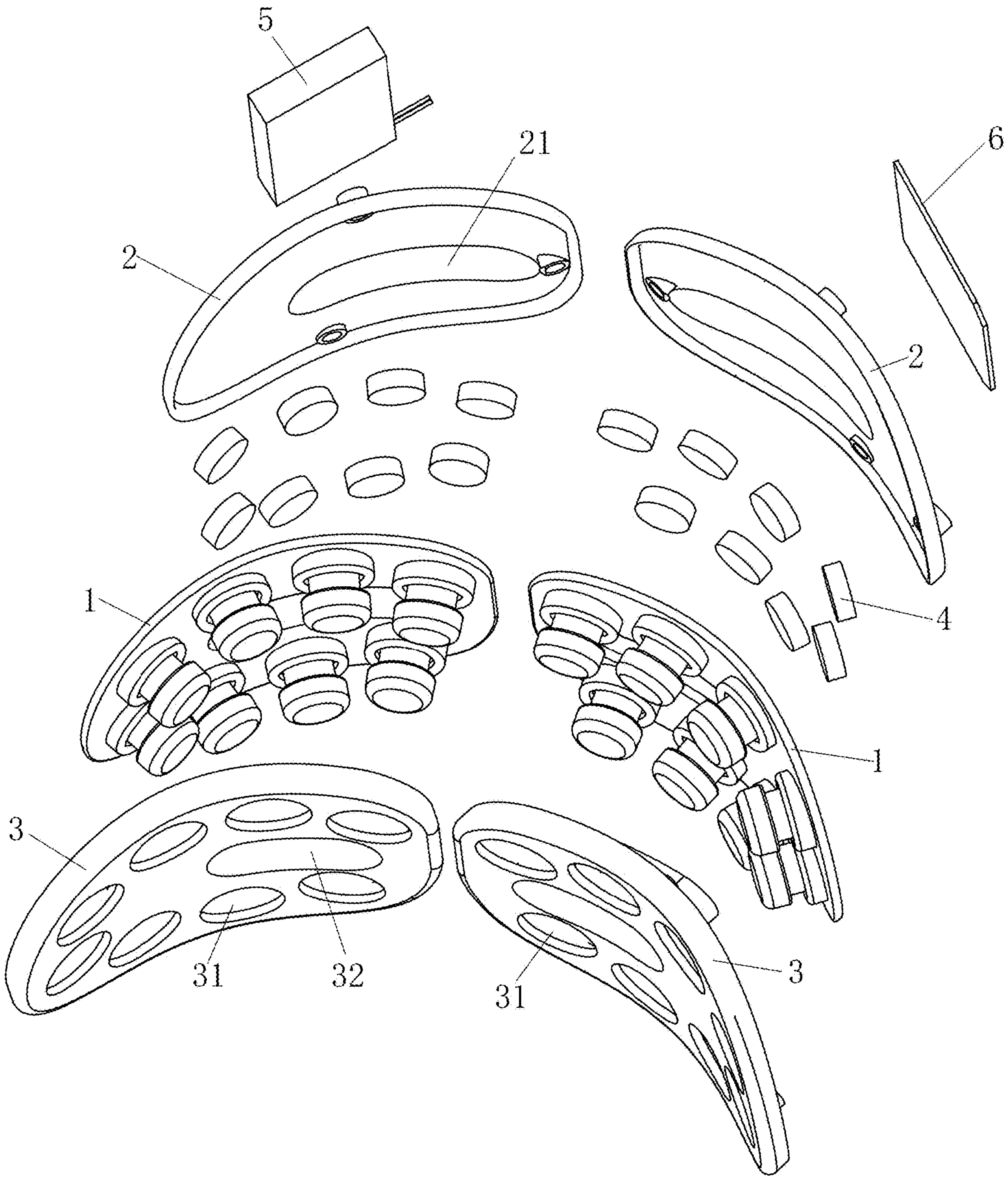
FIG. 1 is a perspective exploded view of a smart wearable device provided by an embodiment of the present application.
Figure 2:
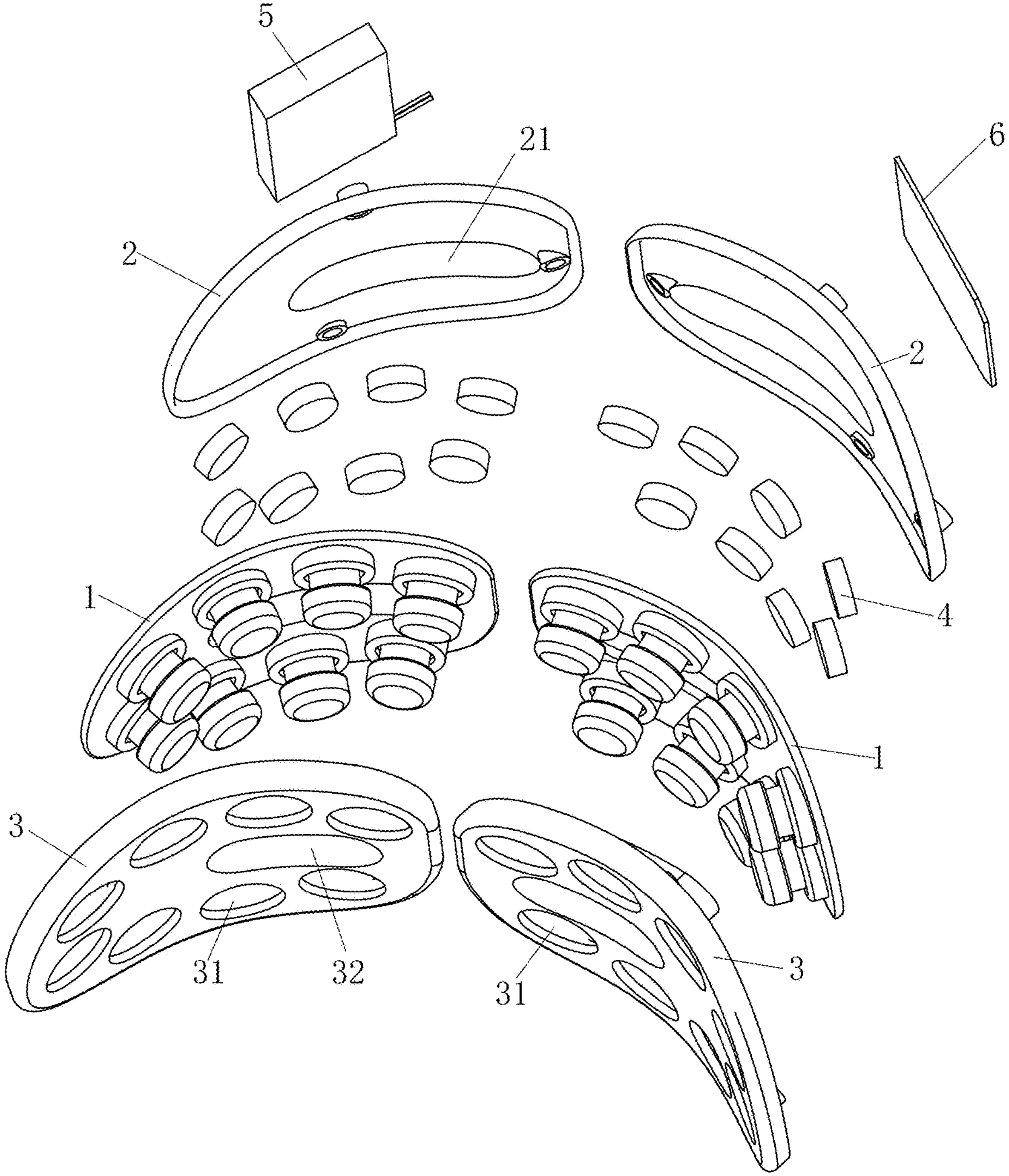
FIG. 2 is a perspective view of the embodiment.
Figure 3:
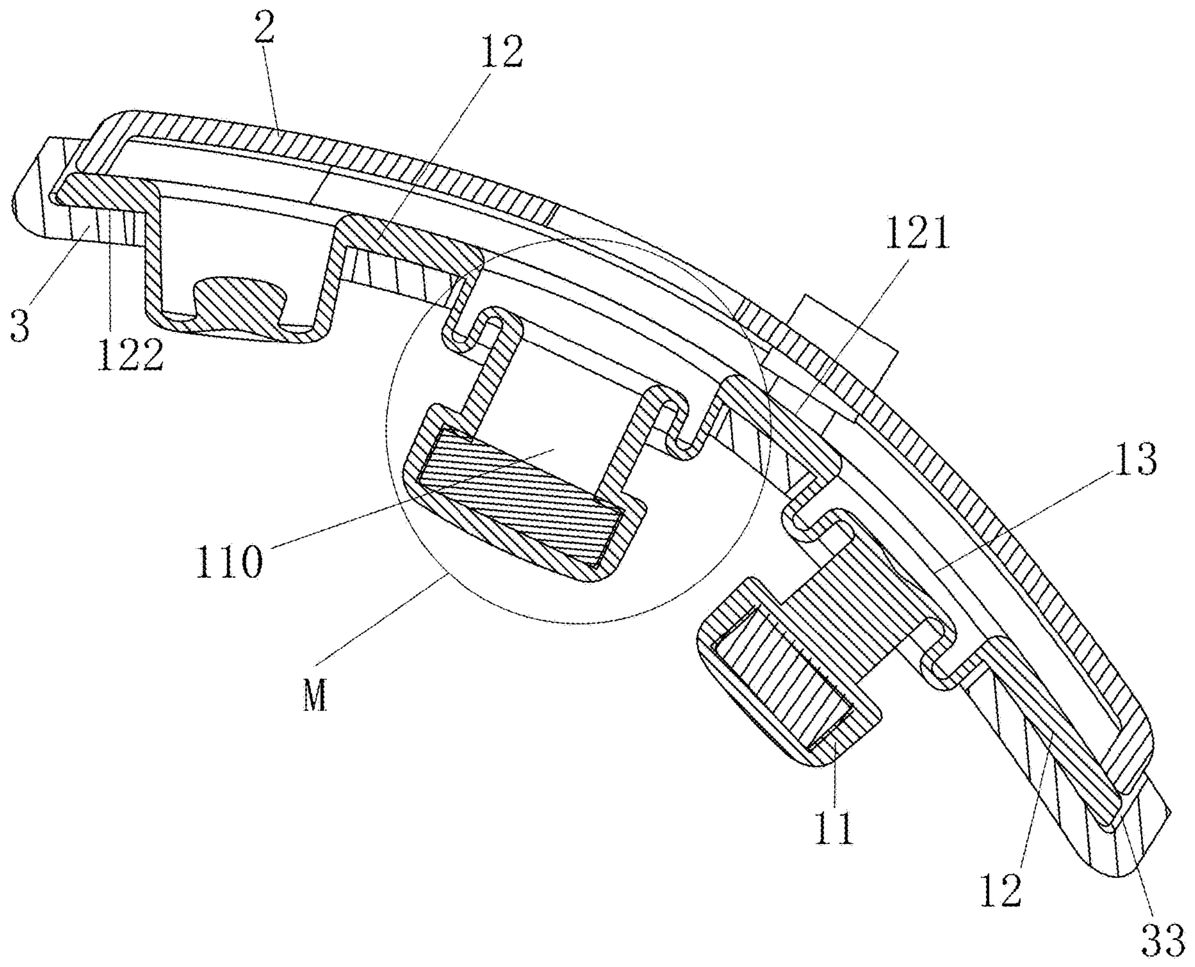
FIG. 3 is a schematic cross-sectional view of the embodiment.
Figure 4:
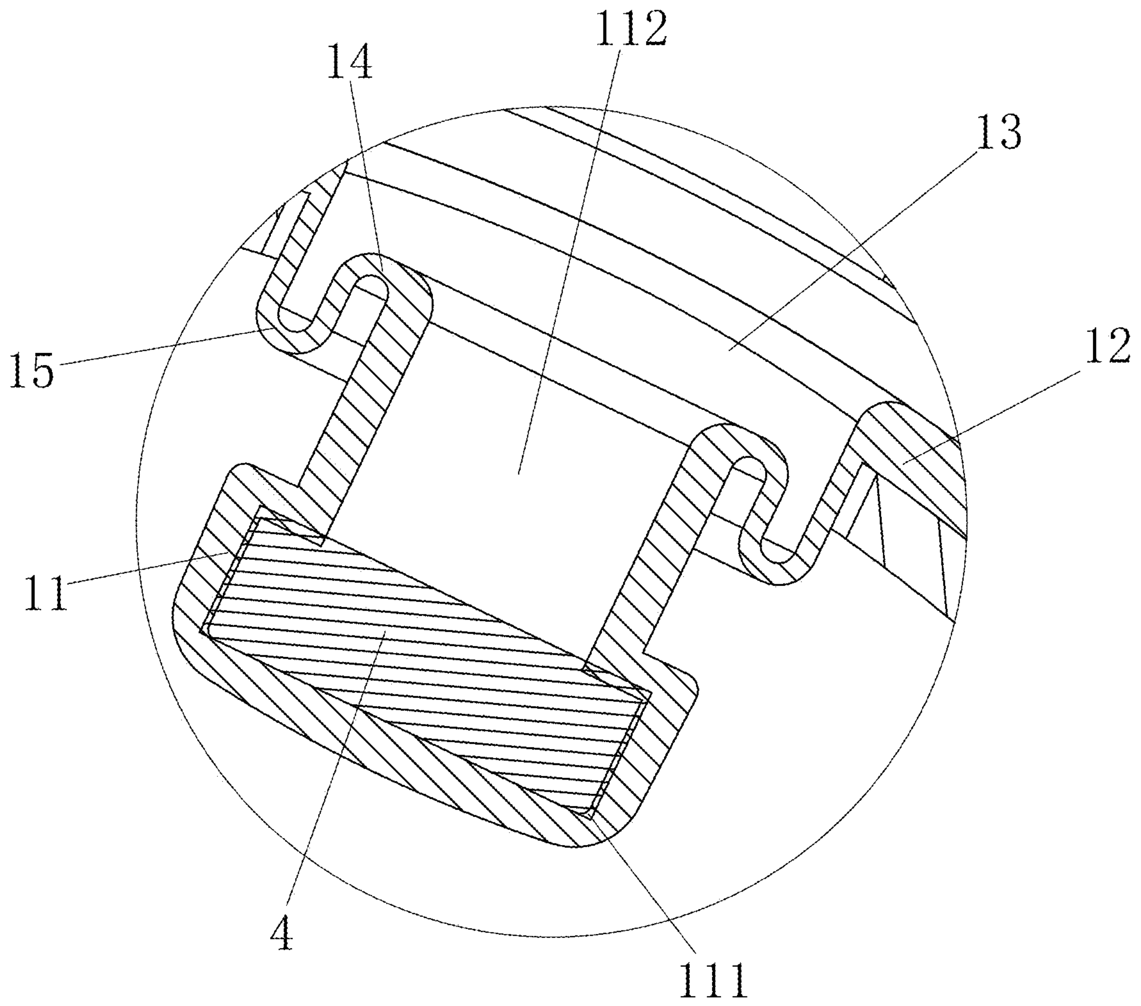
FIG. 4 is a partial enlarged view of the point M in FIG. 3.
Figure 5:
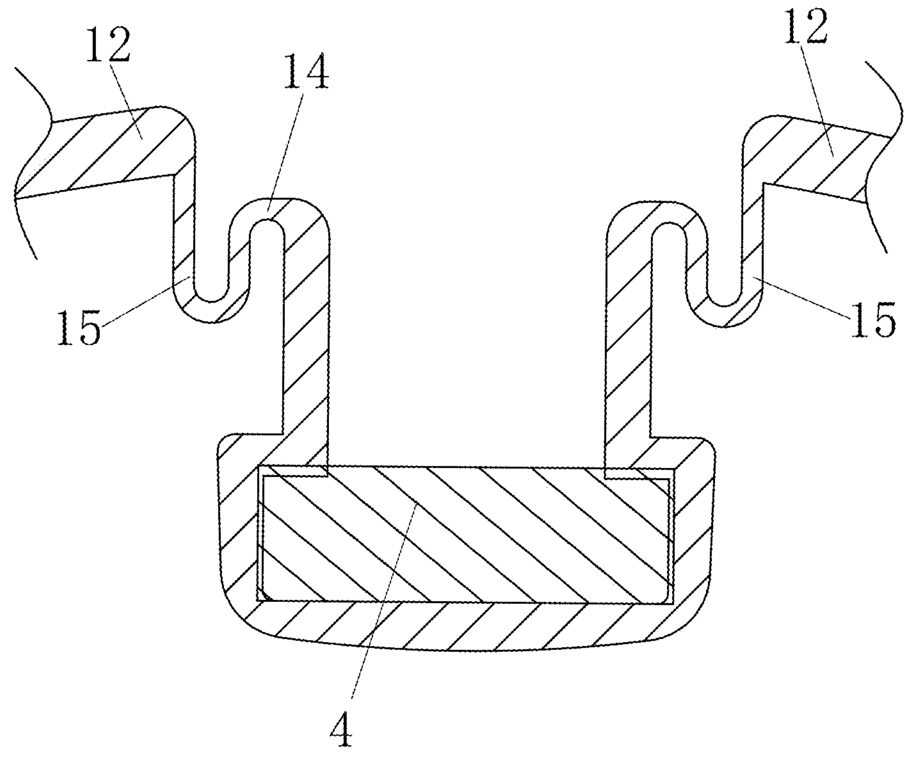
FIG. 5 is a structural schematic view reflecting the connection relationship between a pleated body, a base plate and a massage head of the embodiment.
Figure 6:
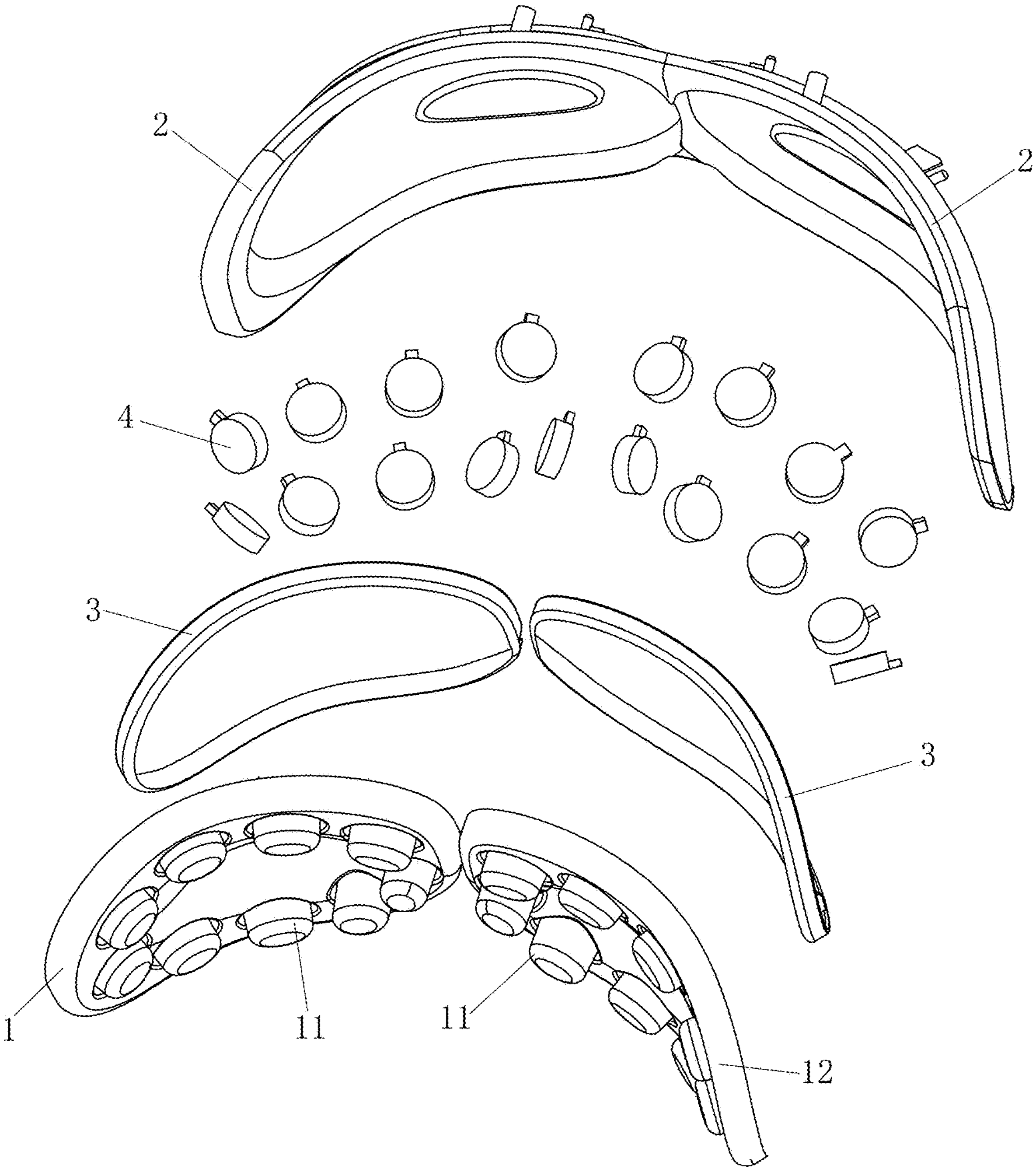
FIG. 6 is a perspective exploded view of a smart wearable device provided by another embodiment of the present application.
Figure 7:
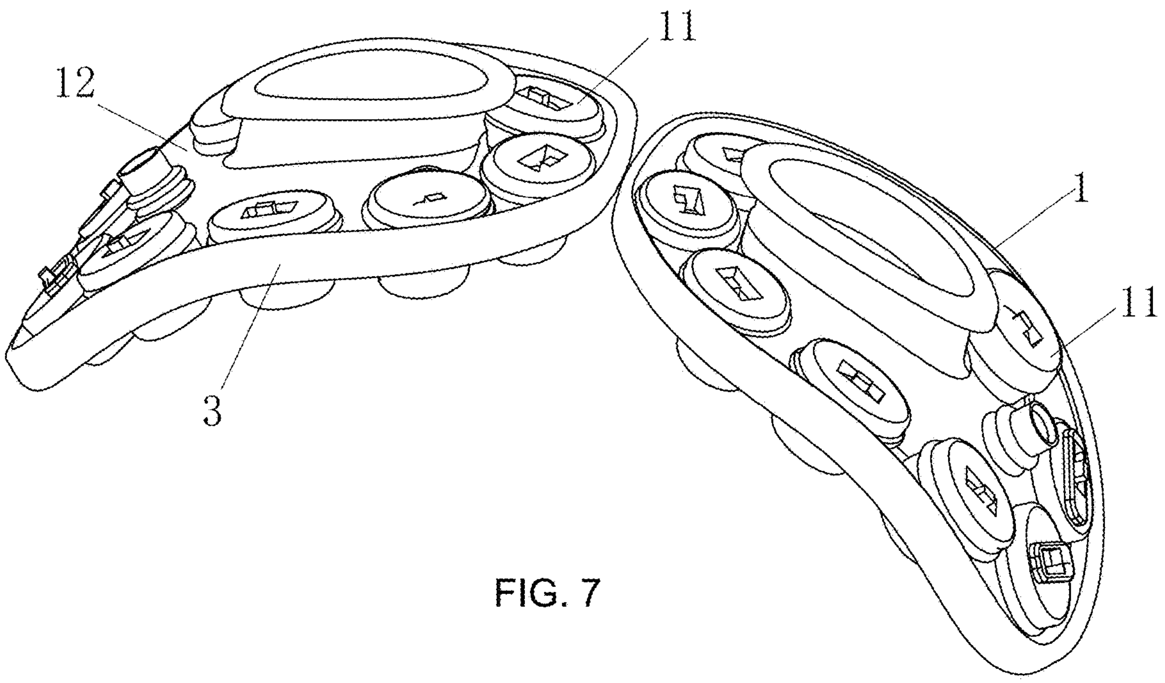
FIG. 7 is a perspective view of the another embodiment.
Figure 8:
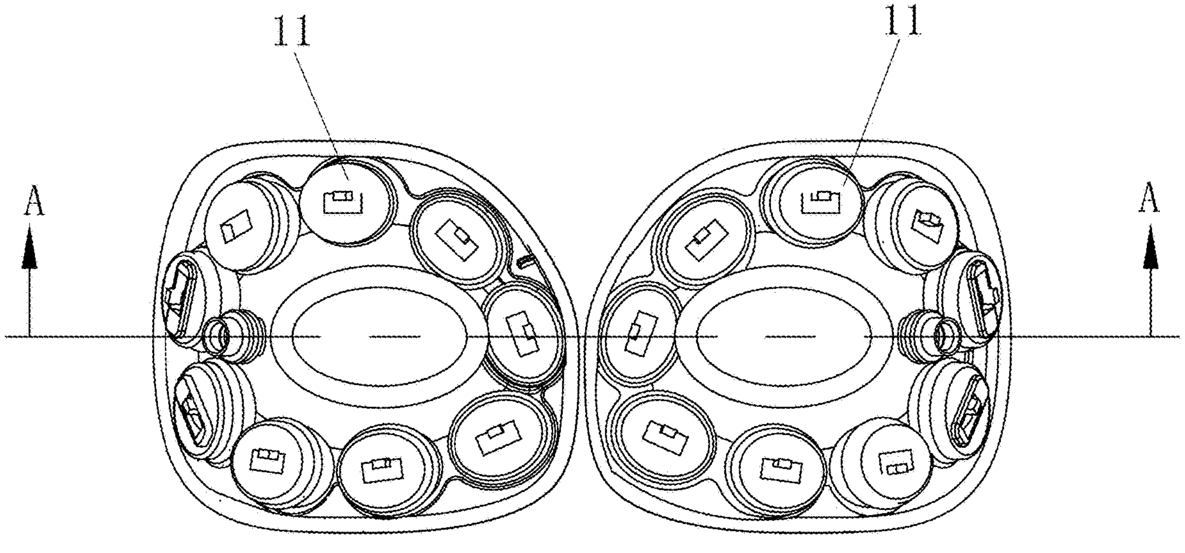
FIG. 8 is a front view of the another embodiment.
Figure 9:
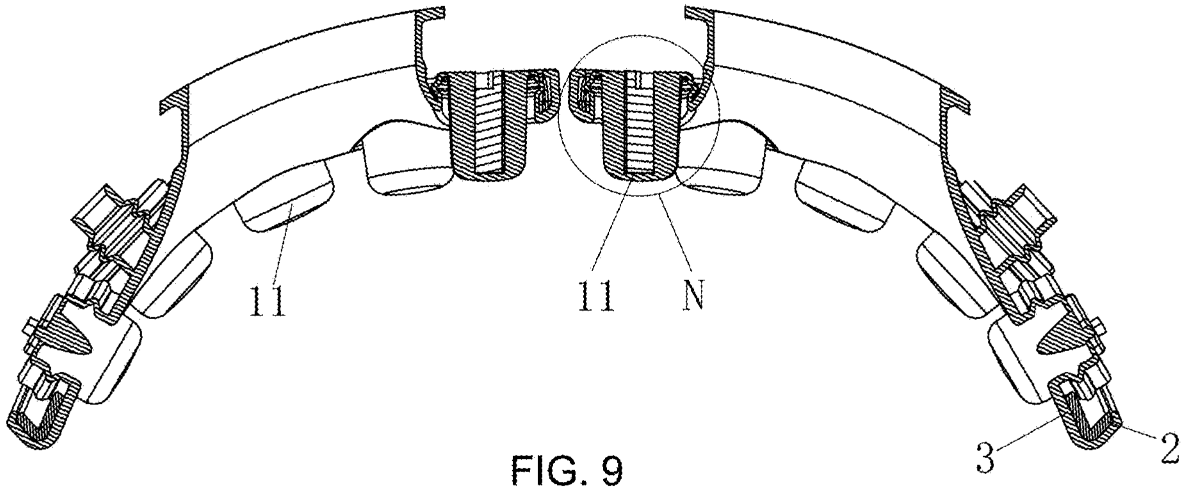
FIG. 9 is a schematic cross-sectional view of FIG. 8 along a A-A direction.
Figure 10:
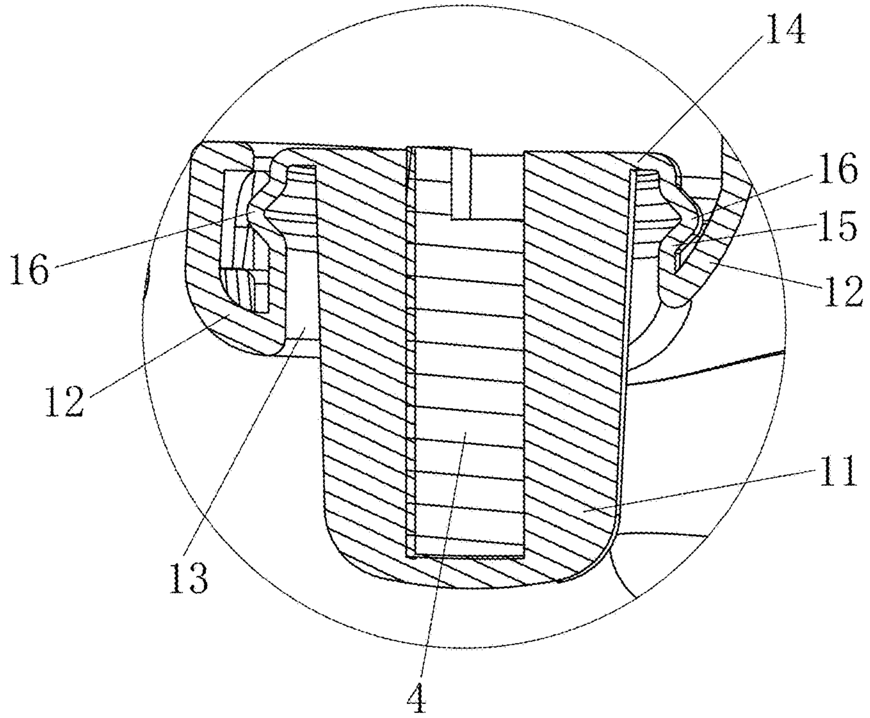
FIG. 10 is a partial enlarged view of the pointed N in FIG. 9.

In order to make the objectives, technical solutions, and advantages of the present application clearer, the following further describes the present application in detail with reference to the accompanying drawings and embodiments. It should be understood that the specific embodiments described here are only used to explain the present invention, and are not used to limit the present application.

It should be noted that when a component is referred to as being "fixed to" or "disposed on" another component, it can be directly on another component or indirectly on another component. When a component is referred to be "connected" to another component, it can be directly or indirectly connected to another component. The terms "upper", "lower", "left", "right", etc. indicate the orientation or positional relationship based on the orientation or positional relationship shown in the drawings, and are only for ease of description, and do not indicate or imply the device referred to, or the element must have a specific orientation, be constructed and operated in a specific orientation, and therefore cannot be understood as a limitation of the present application. For those skilled in the art, the specific meaning of the above terms can be understood according to specific conditions. The terms "first" and "second" are only used for ease of description, and cannot be understood as indicating or implying relative importance or implicitly indicating the number of technical features. The meaning of "plurality" means two or more than two, unless otherwise specifically defined.

In order to illustrate the technical solutions described in the present application, detailed descriptions are given below in conjunction with specific drawings and embodiments.

As shown in FIGS. 1 to 5, a vibration assembly includes a body and a plurality of vibration members 4. The body is made of a soft rubber material that can be deformed by an external force and can be recovered when the external force is removed. The vibration assembly includes a base plate 12, a plurality of massage heads 11 and a plurality of pleated bodies 15. The base plate 12 is an arc-shaped plate-shaped body, which has an inner surface 122 adjacent to a human body of the user and an outer surface 121 away from the human body of the user, and a plurality of through holes 13 are formed penetrating the inner surface and the outer surface. The massage heads 11, the pleated bodies 15 and the through holes 13 are in one-to-one correspondence. Each of the massage heads 11 is a hollow cylindrical body with a mounting cavity 110 extending in the axial direction of the massage head. The bottom of the mounting cavity 110 is opened and the top of the mounting cavity 110 is closed, and the bottom of the massage head is provided with a ring of lip 14 extending outward in the radial direction of the massage head.

Each pleated body 15 is an annular revolving body, and its longitudinal section is U-shaped, and the longitudinal section of the pleated body 15 passes through the axis of the massage head. The pleated body 15 surrounds the corresponding massage head 11, one end of the bottom of the U-shaped f pleated body is integrally connected with the lip 14 of the massage head, and the other end of the bottom is integrally connected with the edge of the through hole 13, and the arc-shaped top is lower than a top of the massage head.

The base plate 12, the pleated body 15 and the massage head 11 are integrally molded by injection molding, and the pleated body 15 can stretch in the axial direction of the massage head 11, so that the massage head 11 is floating and supported above the through hole 13 of the base plate. When the pleated body 15 is contracted, the bottom of the massage head 11 can penetrate downwardly into the through hole 13 or penetrate downwardly out of the through hole 13. When an external force is applied, the pleated body 15 is deformed and can stretch in the axial direction of the massage head and move left and right in the radial direction of the massage head.

The vibration assembly can be applied to a smart wearable device. The smart wearable device can be worn on the human body of the user, such as head, eyes, torso or limbs and so on. With the vibration assembly, the operating of pressing and kneading to the human body can be realized.

The smart wearable device includes a front housing, a bottom housing 2, a bracket 3 and the vibration assembly 1. The bottom housing 2 is fixed on the inner side of the front housing to form a casing with a mounting space, and a main circuit board 6 and a power supply 5 are fixed in the mounting space.

There are two vibration assemblies 1 corresponding to the left eye area and the right eye area of the user. The bracket 3 is made of hard material, and there are two brackets 3, which are respectively corresponding to the left eye area and the right eye area of the user. The brackets 3 are provided with a plurality of first avoiding holes 31 and two second avoiding holes 32 penetrating the brackets from a front side to a rear side. The first avoiding holes 31 in one-to-one correspondence to the massage heads 11 of the vibrating assembly, and are configured for the corresponding massage heads to pass through, and a hole diameter of the first avoiding hole 31 is larger than an outer diameter of the massage head, so that when the massage head is deformed under the external force, it is not easy to interfere with the edge of the first avoiding hole. The second avoiding holes 32 correspond to the eyes of the user, and are configured for avoiding of the eyes of the user.

The outer surface of the bracket 3 facing the bottom housing can be provided with a matching groove 33 which matches with the base plate 12 of the vibration assembly. When assembling, the two brackets 3 are fixed on the inner side of the bottom housing 2; the base plates 12 of the two vibration assemblies are respectively embedded in the matching grooves 33 of the two brackets 3, and the massage heads 11 of each vibration assembly extend inwardly out of the corresponding first avoiding holes 31.

The main control board is signal-connected with each vibrating member, and each vibrating member can be controlled to work independently through the main control board.

In the embodiment, the mounting cavity 110 of the massage head includes a first installation cavity 111 with a larger inner diameter and a second installation cavity 112 with a smaller inner diameter. The vibrating member 4 can be mounted in the first mounting cavity 111, and positioned through a step at the junction of the first mounting cavity 111 and the second mounting cavity 112. The vibrating member 4 adopts an existing structure, for example, it may have a rotor and a vibrator eccentrically mounted on the rotor. The vibrating member 4 is placed flat in the mounting cavity 110 of the massage head, that is, the rotation axis of the vibrating member is coincident with or parallel to the axis of the massage head.

In the embodiment, when the vibrating member 4 is working, since the body of the vibrating assembly is made of soft rubber, and the pleated bodies 15 are arranged at the bottom of the massage head, the vibration transmitted to the bracket or other assembly parts can be effectively reduced, and the generation of the resonance and noise can be effectively controlled. Since the massage head and the pleated body are made of soft rubber, they can be deformed when an external force is applied, so that the massage head can adapt to the human body of the user.

As shown in FIGS. 6 to 10, it is another implementation of a smart wearable device. The smart wearable device includes a front housing, a bottom housing 2, a bracket 3 and a vibration assembly 1.

The bottom housing 2 is fixed on the inner side of the front housing to form a casing with a mounting space, and the power supply and the main control board are fixed in the mounting space.

There are two vibration assemblies 1, one for the left eye area and another for the right eye area. The vibrating assembly 1 includes a body and a plurality of vibrating members 4. The body is made of a soft rubber material through integrally injection molding. The vibrating assembly includes a base plate 12, a plurality of massage heads 11, and a plurality of pleated bodies 15. The base plate 12 is an arc-shaped plate-shaped body, which has an outer surface and an inner surface, and a plurality of through holes 13 are formed penetrating the inner surface and the outer surface. The massage heads 11 are in one-to-one correspondence to the through holes 13 of the base plate. The massage heads 11 are hollow cylindrical bodies, and the bottom of each massage head 11 has a ring of lip 14 extending outward in the radial direction of the massage head.

Each pleated body 15 is an annular revolving body with a curved section 16 in the middle portion of the pleated body 15. The bottom of the pleated body 15 is integrally connected with the lip 14 of the massage head, and the top of the pleated body 15 is integrally connected with the edge of the through hole 13, and the bottom of the massage head 11 can extend into the through hole 13 of the base plate. By providing the pleated body 15 with the curved section 16, the stretching of the massage head 11 in the axial direction can be achieved.

There are two brackets 3, which are corresponding to the two vibration assemblies 1 respectively. The brackets 3 are hard annular body, the brackets 3 are embedded with the base plate 12 of the corresponding vibration assembly, and each bracket 3 is fixed on the inner side of the bottom housing 2.

In the embodiment, the vibrating member 4 is vertically placed in the mounting cavity of the massage head, that is, the rotation axis of the vibrating member is perpendicular to the axis of the massage head.

Figure 11:
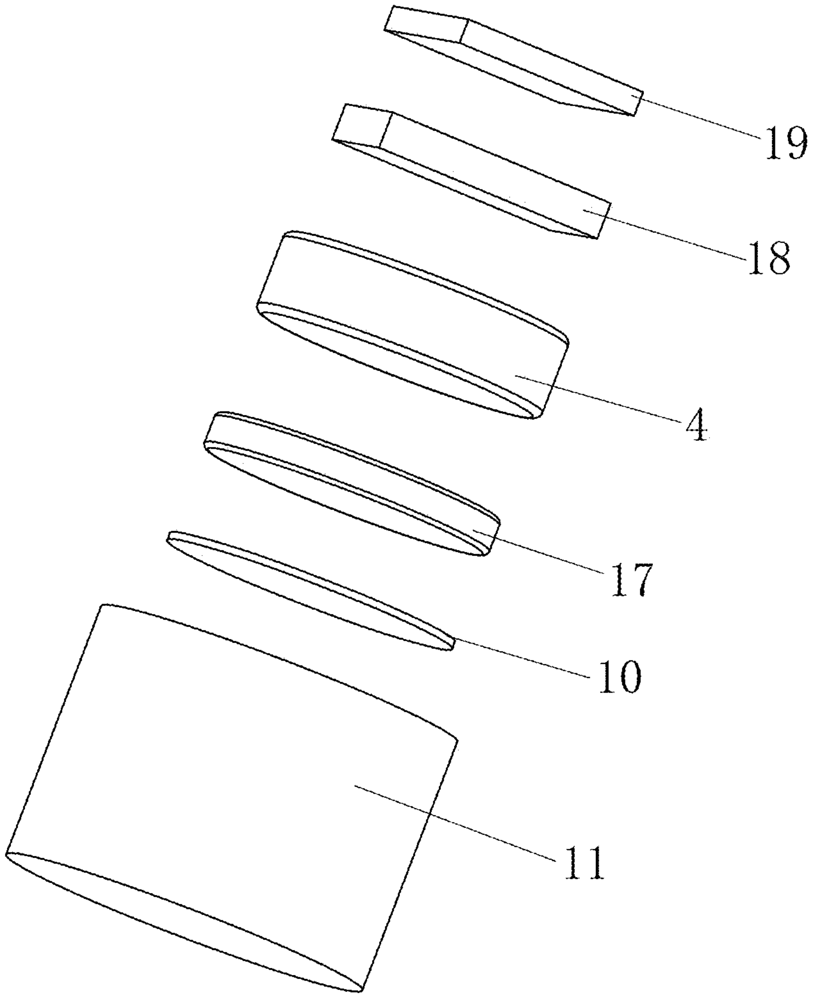
FIG. 11 is a perspective exploded view of the massage head unit.
Figure 12:
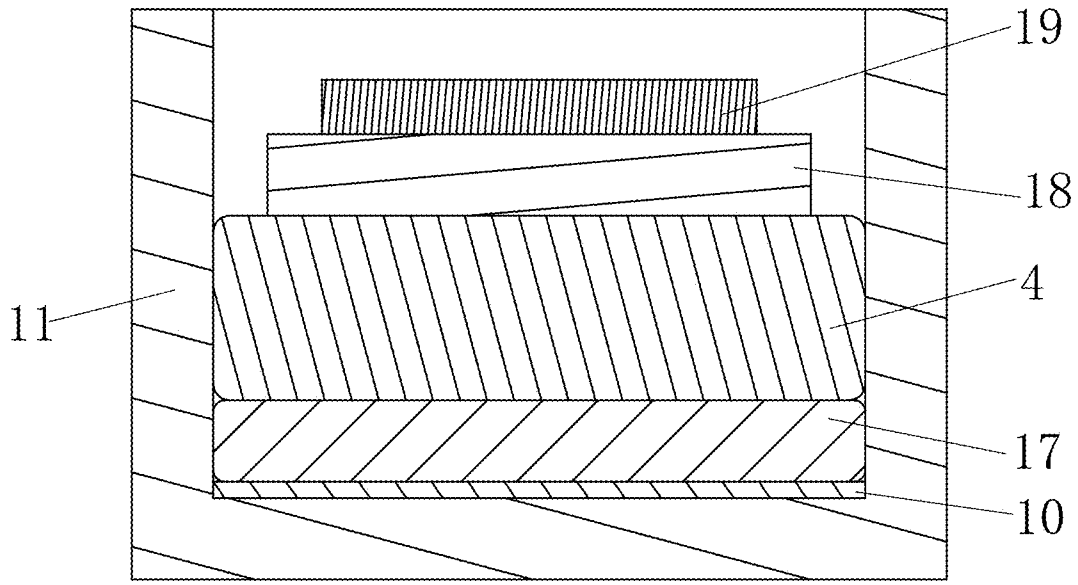
FIG. 12 is a schematic cross-sectional view of the massage head unit.

As shown in FIGS. 11 and 12, it shows a massage head unit that includes a massage head 11 and a heating sheet 10, a heat insulation sheet 17, a vibrating member 4, a pressure sensor 18 and a drive control board 19 which are sequentially stacked and fixed inside the massage head from the inside to the outside. By arranging the pressure sensor 18, the massage head unit has a data detection function. The drive control board 19 may include an information processing unit and a control unit. The information processing unit receives and processes a detected data of the pressure sensor 18. The control unit receives a processing signal of the information processing unit to generate a corresponding control instruction, which controls the working state of the massage head unit and constitutes a massage head unit that can be automatically detected and controlled, so that the working parameters and the opening and closing control of each vibrating member can be independently adjusted, and the controlling of the working state of the heating plate 10 can be realized.

The smart wearable device can have a plurality of massage head units. For each massage head unit, the drive control board is signal-connected to the vibrating member, and each drive control board is signal-connected to the main control board in the casing of the smart wearable device, the main control board realizes the coordinated control of each vibrating part through each drive control board.

For the smart wearable device, the vibration assembly includes a plurality of vibrating members. All the vibrating members can be placed flat in the corresponding massage heads, all the vibrating members can also be placed vertically in the corresponding massage heads, or some of the vibrating members are placed flat and the other of the vibrating members are placed vertically.

For the smart wearable device, which includes a front housing, a bottom housing and a plurality of massage head units. The bottom housing is fixed on the inner side of the front housing, and a mounting space is formed between the front housing and the bottom housing. Each massage head unit includes a massage head and a pleated body integrally molded by injection molding, a vibration member is fixed inside the massage head, and the pleated body connects the massage head and the bottom housing. Specifically, the pleated bodies of the plurality of massage head units can be integrally connected with the same soft rubber base plate, and the base plate is fixed to the bottom housing; or, the corrugated bodies of each massage head unit are directly connected with the bottom housing.

For the smart wearable device, it can be worn on the human body of the user such as the head, eyes, torso, or limbs and so on. With the vibration action of the vibration assembly, operations such as kneading and pressing to the human body of the user can be realized.

For the smart wearable device, when the vibrating member is working, it drives the massage head to vibrate. Since the massage head and the pleated body are both deformable soft gels, it can effectively reduce or eliminate resonance and noise. Since the massage head is made of soft rubber material and can be elastically deformed, the massage head can be adaptively adjusted according to the contours of the human body of the user when it is worn.

The above are only optional embodiments of the application, and are not used to limit the application. For those skilled in the art, the present application can have various modifications and changes. Any modification, equivalent replacement, improvement, etc. made within the spirit and principle of the present application shall be included in the scope of the claims of the present application.

What is claimed is:

1. A vibration assembly, comprising:
- a soft rubber base plate,
- a plurality of vibrating members,
- a plurality of soft rubber massage heads, and
- a plurality of soft rubber pleated bodies capable of stretching and deforming in an axial direction of each massage head;
- wherein the base plate, the pleated bodies and the massage heads are integrally molded by injection molding, the base plate is provided with a plurality of through holes penetrating therethrough, and the through holes, the pleated bodies and the massage heads are in one-to-one correspondence, each massage head is provided with a mounting cavity, and the mounting cavity of each massage head is mounted with at least one vibrating member of the plurality of vibrating members, each pleated body is connected to a bottom of the massage head and an edge of the through hole, such that each of the massage heads is floating and supported on the edge of the through hole.

2. The vibration assembly according to claim 1, wherein the bottom of each massage head is provided with a ring of lip extending outwardly in a radial direction of the massage head, each pleated body is a revolving body surrounding the massage head, a longitudinal section of the pleated body is U-shaped, and two ends of the pleated body are respectively connected to the edge of the through hole and the lip.

3. The vibration assembly according to claim 1, wherein the bottom of each massage head is provided with a ring of lip extending outwardly in a radial direction of the massage head, each pleated body is a revolving body surrounding the massage head, a middle portion of the massage head is provided with a curved section, a bottom of the pleated body is connected to the lip, and a top of the pleated body is connected to the edge of the through hole.

4. The vibration assembly according to claim 1, wherein the mounting cavity extends in the axial direction of the massage head, a bottom of the mounting cavity is opened and a top of the mounting cavity is closed, the vibrating members are placed vertically or flat in the mounting cavity.

5. The vibration assembly according to claim 4, wherein each massage head is a hollow cylindrical body.

6. A massage head unit, comprising:
- a vibrating member,
- a soft rubber massage head, and
- a soft rubber pleated body capable of stretching and deforming in an axial direction of the massage head;
- wherein the pleated body and the massage head are integrally molded by injection molding, the massage head is provided with a mounting cavity, the vibrating member is mounted in the mounting cavity of the massage head, and the pleated body is connected with a bottom of the massage head to cooperatively form an S-shaped longitudinal section which is parallel to the axial direction of the massage head.

7. The massage head unit according to claim 6, wherein the massage head unit further comprises a drive control board, the drive control board is signal-connected to the vibrating member, and the drive control board is fixed in the mounted cavity.

8. The massage head unit according to claim 7, wherein the massage head unit further comprises a heating sheet, a heat insulation sheet, and a pressure sensor, and the heating sheet, the heat insulation sheet, the vibrating member and the pressure sensor are sequentially stacked and fixed inside the massage head from an inside to an outside.

9. The massage head unit according to claim 8, wherein the drive control board comprises an information processing unit and a control unit, the information processing unit is configured to receive and process a detected data of the pressure sensor, and the control unit is configured to receive a processing signal of the information processing unit and to generate a corresponding control instruction, the control instruction controls a working state of the massage head unit.

10. A smart wearable device, comprising a hard casing, wherein the smart wearable device further comprises a plurality of massage head units according to claim 6, and the pleated body of each massage head unit is connected to an inner side of the casing.

11. The smart wearable device according to claim 10, wherein the smart wearable device further comprises a base plate; the base plate, the pleated bodies and the massage heads are integrally molded by injection molding, the base plate is provided with a plurality of through holes penetrating therethrough, and the through holes, the pleated bodies and the massage heads are in one-to-one correspondence, each pleated body is connected to a bottom of the massage head and an edge of the through hole, and the base plate is fixed at the inner side of the casing.

12. The smart wearable device according to claim 11, wherein each pleated body is an annular revolving body with a curved section in a middle portion of the pleated body, a bottom of the pleated body is integrally connected with a lip of the massage head, and a top of the pleated body is integrally connected with the edge of the through hole, and the bottom of the massage head is able to extend into the through hole.

13. The smart wearable device according to claim 11, wherein the smart wearable device further comprises brackets, the brackets embed with the base plate, and the brackets are fixed at the inner side of the casing.

14. The smart wearable device according to claim 13, wherein a number of the brackets is two, a number of the base plates is two, and the brackets are arranged corresponding to the base plates.

15. The smart wearable device according to claim 13, wherein a gap is formed between the bottom of the massage head and the casing along the axial direction of the massage head.

16. The vibration assembly according to claim 2, wherein the mounting cavity extends in the axial direction of the massage head, a bottom of the mounting cavity is opened and a top of the mounting cavity is closed, the vibrating members are placed vertically or flat in the mounting cavity.

17. The vibration assembly according to claim 3, wherein the mounting cavity extends in the axial direction of the massage head, a bottom of the mounting cavity is opened and a top of the mounting cavity is closed, the vibrating members are placed vertically or flat in the mounting cavity.

18. The massage head unit according to claim 6, wherein the S-shaped longitudinal section comprises three extending portions arranged at an interval and two connecting portions each being connected between adjacent two of the three extending portions;
- two adjacent extending portions of the three extending portions and one of the two connecting portions cooperatively form a U shape; and
- another two adjacent extending portions of the three extending portions and another one of the two connecting portions cooperatively form an inverted-U shape.

* * * * *